United States Patent
Yoshioka et al.

(10) Patent No.: US 12,010,656 B2
(45) Date of Patent: Jun. 11, 2024

(54) USER EQUIPMENT AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 347 days.

(21) Appl. No.: 17/428,153

(22) PCT Filed: Feb. 15, 2019

(86) PCT No.: PCT/JP2019/005716
§ 371 (c)(1),
(2) Date: Aug. 3, 2021

(87) PCT Pub. No.: WO2020/166088
PCT Pub. Date: Aug. 20, 2020

(65) Prior Publication Data
US 2022/0030553 A1    Jan. 27, 2022

(51) Int. Cl.
*H04W 72/02* (2009.01)
(52) U.S. Cl.
CPC .................................. *H04W 72/02* (2013.01)
(58) Field of Classification Search
CPC ......... H04W 72/02; H04W 4/70; H04W 4/40; H04W 92/18
See application file for complete search history.

(56) References Cited

U.S. PATENT DOCUMENTS

| 2019/0132818 A1 | 5/2019 | Yasukawa et al. |
| 2021/0243749 A1* | 8/2021 | Hoang ................ H04W 74/085 |
| 2021/0329596 A1* | 10/2021 | Freda .................. H04W 72/541 |

FOREIGN PATENT DOCUMENTS

WO    2017/179286 A1    10/2017

OTHER PUBLICATIONS

3GPP TS 136 213 V15.2.0 (Oct. 2018), 32 pages (Year: 2018).*
3GPP TSG RAN WG1 Ad-Hoc Meeting 1901; R1-1900483 "Sidelink Resource Allocation Schemes for NR V2X Communication" Intel Corporation; Taipei, Taiwan; Jan. 21-25, 2019 (22 pages).
Extended European Search Report issued in European Application No. 19915401.4, dated Aug. 3, 2022 (8 pages).
International Search Report issued in PCT/JP2019/005716, mailed on May 14, 2019 (5 pages).
Written Opinion of the International Searching Authority issued in PCT/JP2019/005716, mailed on May 14, 2019 (4 pages).
InterDigital Inc.; "Resource Allocation for NR V2X"; 3GPP RAN WG1 Meeting #95, R1-1813164; Spokane, USA; Nov. 12-16, 2018 (9 pages).

(Continued)

*Primary Examiner* — Sharmin Chowdhury
(74) *Attorney, Agent, or Firm* — Osha Bergman Watanabe & Burton LLP

(57) ABSTRACT

Provided is a user equipment including a transmitting unit that transmits a packet for terminal-to-terminal direct communication and a control unit that selects a transmission resource for transmitting the packet from candidate resources in a resource selection window having a predetermined range.

3 Claims, 9 Drawing Sheets

(56) References Cited

OTHER PUBLICATIONS

Ericsson; "On Mode 2 Resource Allocation for NR Sidelink"; 3GPP TSG-RAN WG1 Meeting #95, R1-1813641; Spokane, WA, US, Nov. 12-16, 2018 (13 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)"; Jun. 2017 (460 pages).
Office Action issued in the counterpart Chinese Patent Application No. 201980091264.3, mailed on Dec. 6, 2023 (17 pages).
Office Action issued in European Patent Application No. 19915401.4, mailed on Apr. 16, 2024 (7 pages).

* cited by examiner

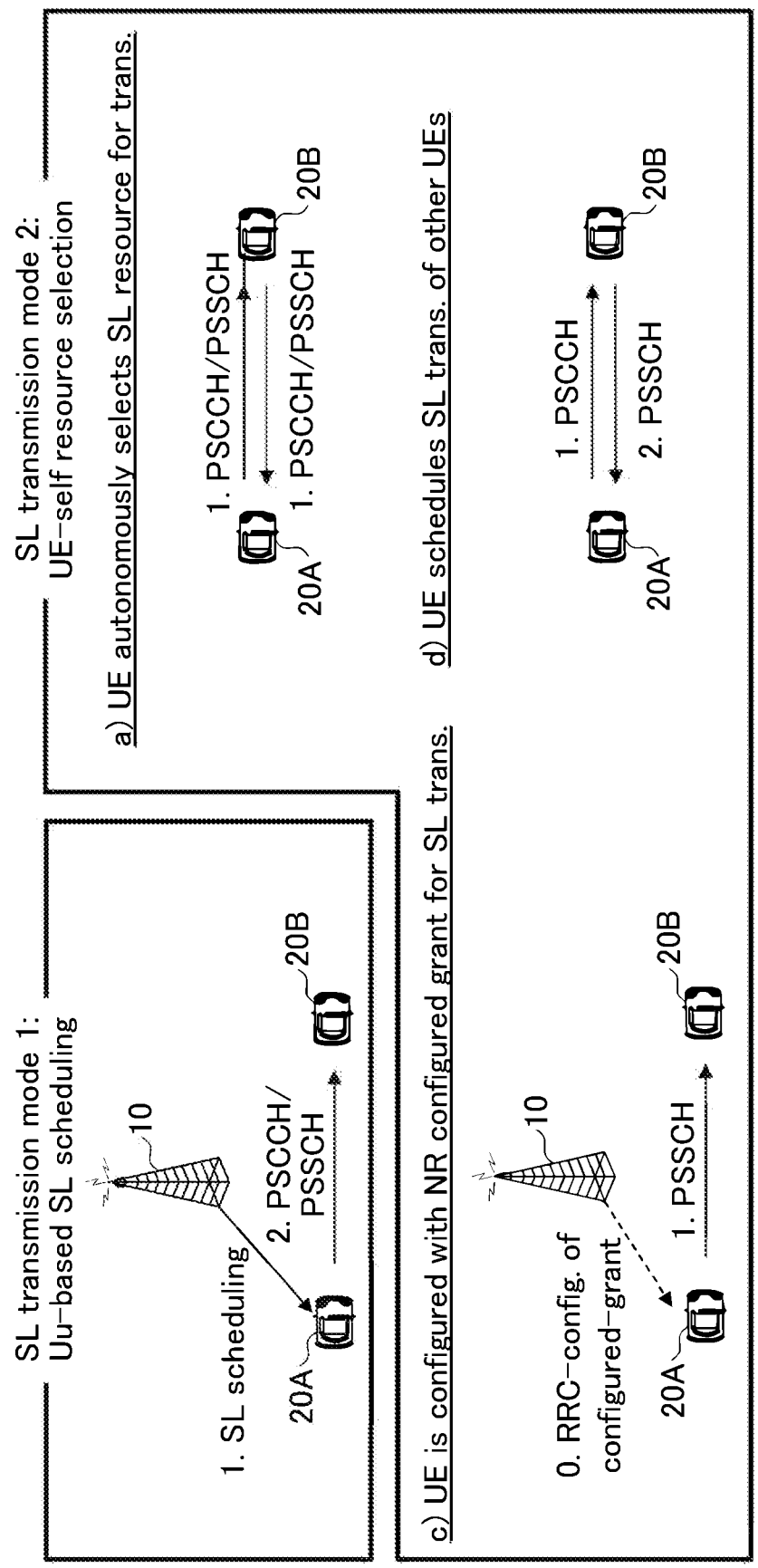

FIG.2

Agreements in RAN1 #95 were made, (note: mainly for mode 2a)

■ Sensing procedure is defined as SCI decoding from other UEs and/or sidelink measurements
 - FFS information extracted from SCI decoding
 - FFS sidelink measurements used
 - FFS UE behavior and timescale of sensing procedure
 - Note: It is up to further discussion whether SFCI is to be used in sensing procedure
 - Note: Sensing procedure can be discussed in the context of other modes ■ Resource (re)-selection procedure uses results of sensing procedure to determine resource(s) for sidelink transmission
 - FFS timescale and conditions for resource selection or re-selection
 - FFS resource selection / re-selection details for PSCCH and PSSCH transmissions
 - FFS details for PSFCH (e.g. whether resource (re)-selection procedure based on sensing is used or there is a dependency/association b/w PSCCH/PSSCH and PSFCH resource)
 - FFS impact of sidelink QoS attributes on resource selection / re-selection procedure

FIG.3

Agreements in RAN1 #AH1901 were made, (note: mainly for mode 2a)

■ Mode-2 supports the sensing and resource (re)-selection procedures according to the previously agreed definitions.
  • FFS resource granularity for sensing & resource (re)-selection, e.g., PRB(s), slots, resource patterns (when applicable), etc.
  • FFS detailed conditions when these procedures can apply ■ SCI decoding applied during sensing procedure provides at least information on sidelink resources indicated by the UE transmitting the SCI ■ Sub-channel based resource allocation is supported for PSSCH
  – FFS details for sub-channels
  – FFS other use cases for sub-channel (e.g., measurement, interaction with PSCCH, etc.)

USER EQUIPMENT AND COMMUNICATION METHOD

TECHNICAL FIELD

The present invention relates to a user equipment and a communication method in a wireless communication system.

BACKGROUND ART

In Long Term Evolution (LTE) and systems following LTE (for example, LTE Advanced (LTE-A) and New Radio (NR) (also referred to as 5G)), sidelink (also referred to as Device to Device (D2D) or terminal-to-terminal direct communication) technology has been examined in which communication devices, such as UEs, directly communicate with each other without passing through a base station (Non-Patent Document 1).

In addition, technology for achieving Vehicle to Everything (V2X) has been examined and specified. Here, V2X is a part of Intelligent Transport Systems (ITS) and is a general term of Vehicle to Vehicle (V2V) which means a communication form between vehicles, Vehicle to Infrastructure (V2I) which means a communication form between a vehicle and a road-side unit (RSU) provided on the side of the road, Vehicle to Nomadic device (V2N) which means a communication form between a vehicle and a mobile terminal of a driver, and Vehicle to Pedestrian (V2P) which means a communication form between a vehicle and a mobile terminal of a pedestrian.

CITATION LIST

Non-Patent Document

Non-Patent Document 1: 3GPP TS 36.213 V14.3.0 (2017-06)

SUMMARY OF THE INVENTION

Problem to be Solved by the Invention

In NR-V2X, in a sidelink transmission mode 2 in which the user equipment autonomously selects transmission resources, the user equipment performs a sensing procedure and (re)selects transmission resources on the basis of the results of the sensing procedure, in order to avoid the collision of transmission resources with other user equipments.

When transmitting a packet for terminal-to-terminal direct communication, the user equipment reserves transmission resources. When selecting transmission resources, the user equipment excludes the transmission resources which have already been reserved by other user equipments and selects transmission resources from the remaining transmission resources which have not been excluded.

In the case of LTE, the same mechanism as that in NR-V2X is used. In LTE, periodic traffic is assumed and the next packet transmission is reserved using the previous packet transmission. However, in NR, aperiodic traffic is assumed. Therefore, a new resource reservation mechanism needs to be defined.

The invention has been made in view of the above-mentioned problems and an object of the invention is to provide a technique that defines a resource selection procedure for packet transmission and the transmission of resource reservation signaling in a wireless communication system supporting terminal-to-terminal direct communication. In addition, the invention is not limited to terminal-to-terminal communication in V2X and may be applied to any terminal.

Means for Solving Problem

According to the technique of the present disclosure, there is provided a user equipment including: a transmitting unit that transmits a packet for terminal-to-terminal direct communication; and a control unit that selects a transmission resource for transmitting the packet from candidate resources in a resource selection window having a predetermined range.

Effect of the Invention

According to the technique of the present disclosure, there is provided a technique that defines a resource selection procedure for packet transmission and the transmission of resource reservation signaling in a wireless communication system supporting terminal-to-terminal direct communication.

BRIEF DESCRIPTION OF DRAWINGS

FIG. 1 is a diagram for describing a sidelink transmission mode in NR-V2X;

FIG. 2 is a diagram for describing a sensing procedure related to NR-V2X;

FIG. 3 is a diagram for describing the sensing procedure related to NR-V2X;

MODE(S) FOR CARRYING OUT THE INVENTION

Figure 4:
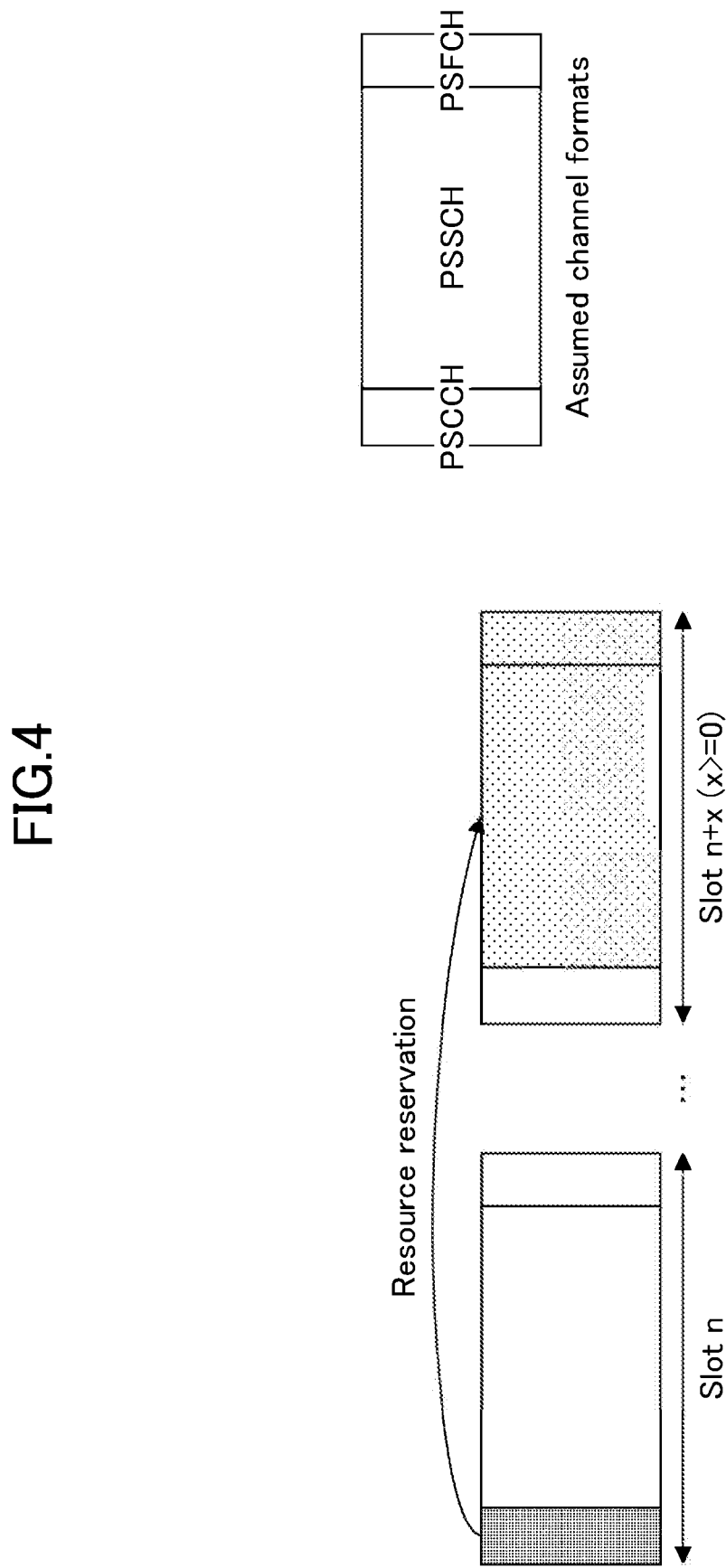
FIG. 4 is a diagram for describing the reservation and selection of transmission resources.

Hereinafter, embodiments (these embodiments) of the invention will be described with reference to the drawings. The embodiments described below are only examples and the embodiments to which the invention is applied are not limited to the following embodiments.

Sidelink Transmission Mode

A sidelink transmission mode in NR-V2X will be described.

FIG. 1 is a diagram for describing the sidelink transmission mode in NR-V2X.

In a sidelink transmission mode 1 of NR-V2X, a user equipment 20A transmits Physical Sidelink Control Channel (PSCCH)/Physical Sidelink Shared Channel (PSSCH) to a user equipment 20B on the basis of sidelink scheduling (SL scheduling) by a base station apparatus 10.

In a sidelink transmission mode 2 of NR-V2X, the user equipment transmits PSCCH/PSSCH on the basis of its resource selection. The sidelink transmission mode 2 of NR-V2X is subdivided. In a sidelink transmission mode 2-a of NR-V2X, the user equipment 20A transmits PSCCH/PSSCH to the user equipment 20B on the basis of the resource selection of the user equipment 20A. The user equipment 20B transmits PSCCH/PSSCH to the user equipment 20A on the basis of the resource selection of the user equipment 20B. In a sidelink transmission mode 2-c of NR-V2X, the user equipment 20A transmits PSSCH to the user equipment 20B according to the Radio Resource Control (RRC) configuration (for example, RRC-config of a resource pattern which is indicated by the base station apparatus 10 or whose specifications have been determined by the base station apparatus 10.

In a sidelink transmission mode 2-d of NR-V2X, the user equipment 20A transmits SL scheduling to the user equipment 20B to perform the transmission scheduling of the user equipment 20B and the user equipment 20B transmits PSCCH/PSSCH to the user equipment 20A on the basis of the scheduling.

In the following description, in a case in which an arbitrary user equipment is indicated, the user equipment is described as a user equipment 20.

FIGS. 2 and 3 are diagrams for describing a sensing procedure related to NR-V2X.

In the sensing procedure illustrated in FIG. 2, sidelink measurement or decoding for SCI from other user equipments 20 is performed. In addition, in a resource selection procedure illustrated in FIG. 2, sidelink transmission resources are (re)selected using the results of the sensing procedure.

In FIG. 3, the sidelink transmission mode 2 supports the sensing procedure and the resource (re)selection procedure. In addition, at least information on the sidelink transmission resources indicated by the user equipment 20 transmitting the SCI is acquired by SCI decoding applied during the sensing procedure.

Figure 5:
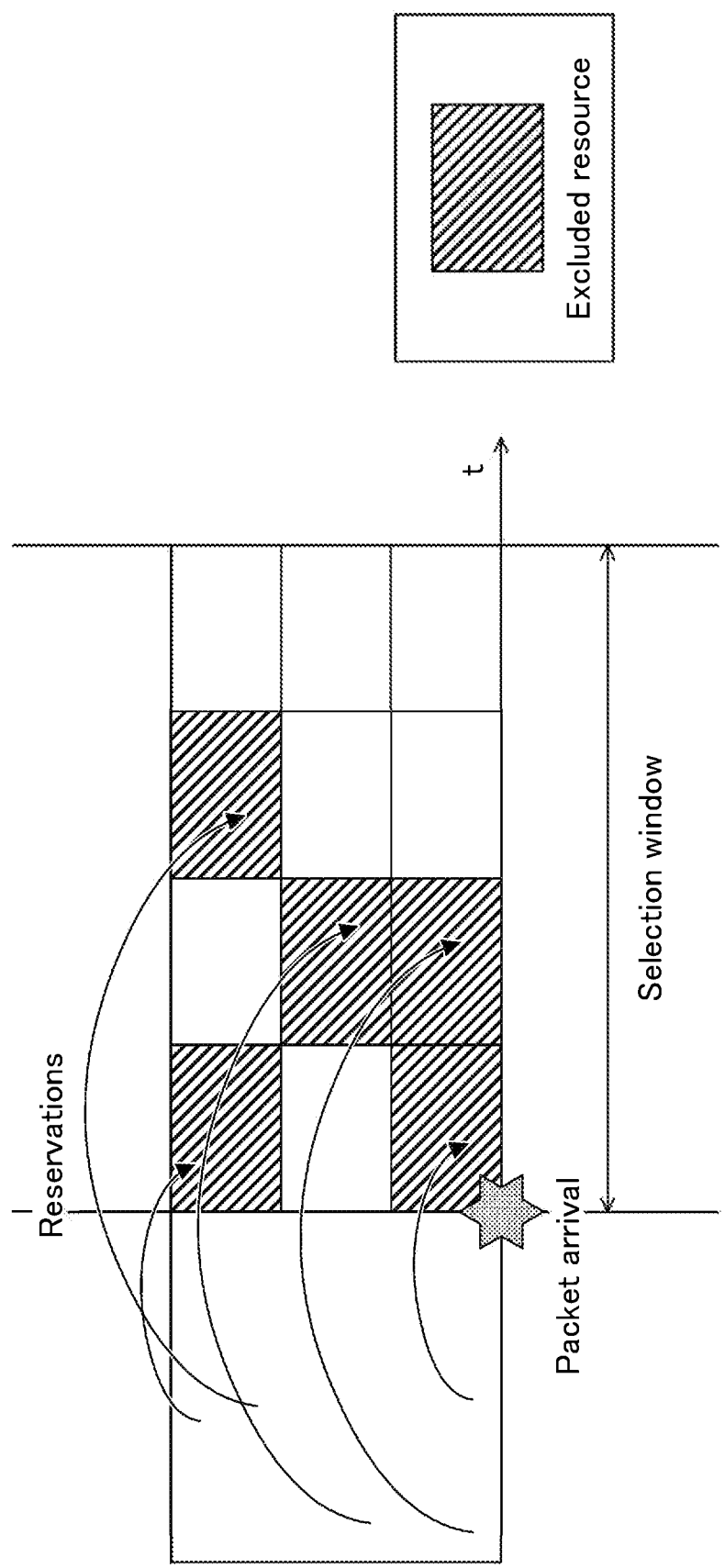
FIG. 5 is a diagram for describing the reservation and selection of transmission resources.

FIGS. 4 and 5 are diagrams for describing the reservation and selection of transmission resources.

As illustrated in FIG. 4, a channel format in which PSCCH, PSSCH, and Physical Sidelink Feedback Channel (PSFCH) are arranged in this order is assumed as an example of the channel format. Before the actual packet transmission is performed by the user equipment 20, the user equipment 20 reserves the transmission resources (for example: PSSCH/PSFCH). For example, PSCCH/PSFCH resources in a slot n+x (x≥0) are reserved by PSCCH in a slot n. In addition, the arrangement of PSCCH, PSSCH, and PSFCH is not limited to FIG. 4 and PSCCH, PSSCH, and PSFCH may be multiplexed in the frequency domain.

As illustrated in FIG. 5, when the user equipment 20 selects a transmission resource (that is, when a packet arrives), the user equipment 20 excludes candidate resources which have already been reserved by other user equipments 20 from the candidate resources in the resource selection window and selects transmission resources from the remaining candidate resources (which have not been excluded).

The "arrival of a packet" may be replaced with the "arrival of a transport block (TB)" or any expression that indicates the timing when an upper layer packet reaches a PHY layer.

Problem to be Solved

In the case of LTE, the same resource selection mechanism as described above is used. In LTE, periodic traffic is assumed and the next packet transmission is reserved using the previous packet transmission. However, in NR, aperiodic traffic is also assumed. Therefore, a new resource selection mechanism or resource reservation signaling needs to be defined (a mechanism used for both periodic traffic and aperiodic traffic may be defined).

The invention has been made in order to solve the above-mentioned problems.

Embodiment 1

As Embodiment 1, it is considered that the user equipment 20 selects transmission resources (PSSCH and PSCCH/PSFCH corresponding to PSSCH) from the candidate resources in the resource selection window having a predetermined range.

Figure 6:
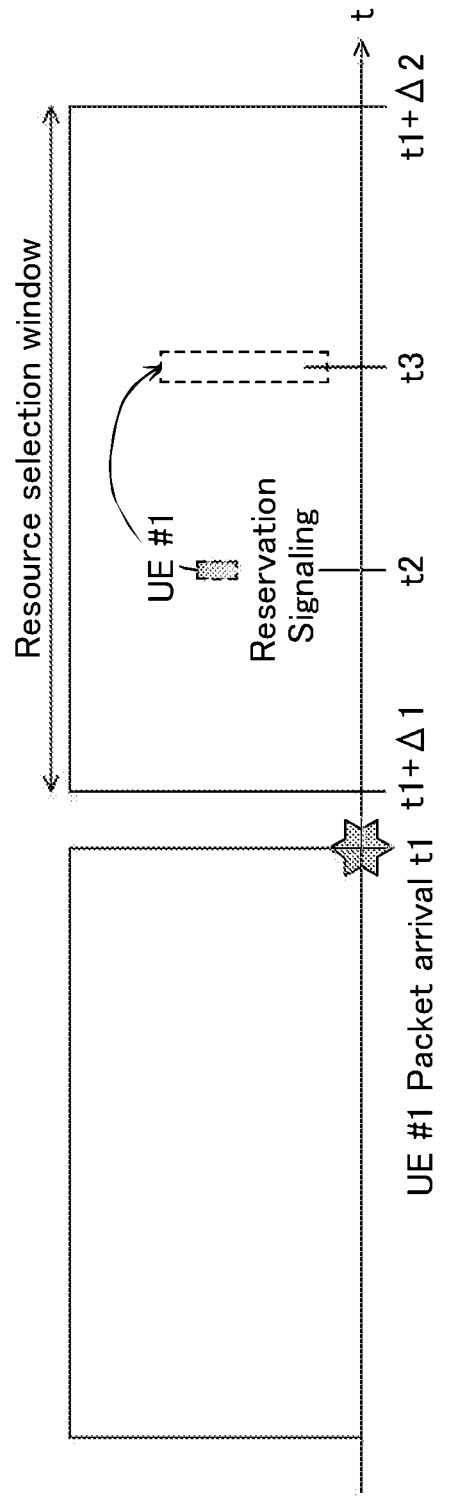
FIG. 6 is a diagram for describing a resource selection window and reservation signaling.

FIG. 6 is a diagram for describing a resource selection window and reservation signaling.

The resource selection window may be determined by the packet arrival timing. For example, as illustrated in FIG. 6, in a case in which a packet arrives at a slot t1, the range of the resource selection window may be defined by t1 (or t1+$\Delta$1 (for example, $\Delta$1≥0)) and t1+$\Delta$2 (for example, $\Delta$2≤delay requirement specification).

The values $\Delta$1 and $\Delta$2 of the time domain may be defined, may be configured (in advance), or may be determined by the capability or implementation of the user equipment.

The unit of the value (t, $\Delta$) of the time domain includes at least a (mini)slot, a (mini)subframe, a symbol, a (Short) TTI, microseconds, and milliseconds.

In the case of unicast transmission or groupcast transmission accompanied by Hybrid Automatic Repeat Request (HARQ) feedback, $\Delta$2 may be determined as follows. That is, the packet delay requirement specification may be determined on the basis of HARD-ACK feedback timing or the HARQ-ACK feedback timing of x-th HARQ retransmission (x may be defined or may be configured (in advance). In addition, x may be 0).

The resources reserved by the reservation signaling transmitted by other user equipments 20 before t1 (or t1+$\Delta$1) (the lower limit of the resource selection window) may be excluded from the candidate resources.

The reservation signaling may be a type of SCI format and is used for reserving PSSCH and PSCCH/PSFCH resources corresponding to PSSCH.

Embodiment 2

As Embodiment 2, after selecting a transmission resource (a resource represented by t3 in FIG. 6), the user equipment 20 selects a resource for reservation signaling transmission from the resources that are to be transmitted earlier than t3 in the resource reservation window.

The resource for reservation signaling transmission may be randomly selected from available resources for reservation signaling transmission which can be transmitted for the period ([t1/t1+4$\Delta$, t3]) from t1 (or t1+$\Delta$1) to t3. In addition, the available resources for reservation signaling transmission may be configured (in advance).

The resources for reservation signaling transmission may be selected from the resources which have been configured (in advance) for reservation signaling transmission and the selected resources may be resources closest to t1 (that is, resources transmitted earliest).

The user equipment transmits the reservation signaling using the resources closest to t1 (that is, the resources to be transmitted earliest) to avoid the transmission resources (the resources represented by t3 in FIG. 6) from being taken away by other user equipments.

In FIG. 6, the selected reservation signaling transmission is represented by t2.

Embodiment 3

Figure 7:
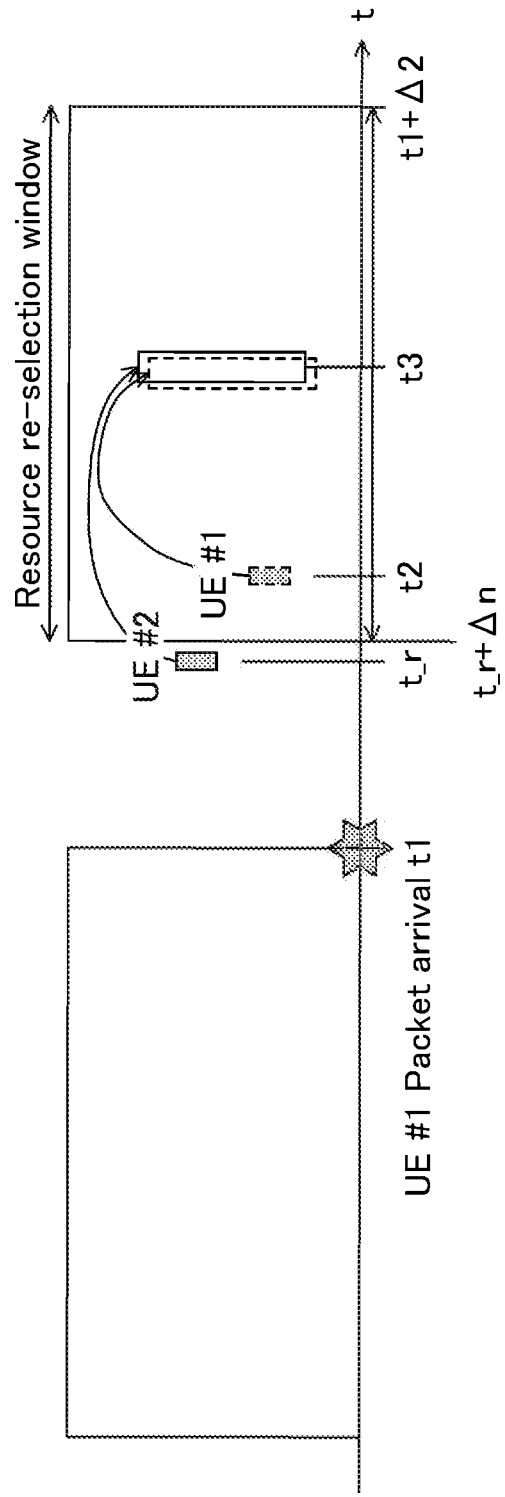
FIG. 7 is a diagram for describing a resource reselection window and reservation signaling.

FIG. 7 is a diagram for describing a resource reselection window and reservation signaling.

As Embodiment 3, it is considered that the operation of the user equipment 20 in a case in which the user equipment 20 detects that (all or some of) the selected resources for packet transmission have been reserved by another adjacent user equipment 20 before transmitting reservation signaling at t2 (that is, t_r (t_r<t2) in FIG. 7) is defined.

The user equipment 20 detecting that the selected resources for packet transmission have been reserved by another adjacent user equipment 20 may stop the transmission of the reservation signaling and the transmission of the selected resources for packet transmission.

The user equipment 20 may reselect resources that replace the resources whose transmission has been stopped.

The range of the resource reselection window may be defined by t_r+Δn and t1+Δ2 ([t_r+Δn, t1+Δ2]).

Δn may be defined. For example, Δn may be 1.

Δn may be configured (in advance) or may be determined by the capability or implementation of the user equipment 20.

Effects

As the effects obtained by the embodiments of the invention, a resource selection procedure for packet transmission and the transmission of resource reservation signaling are defined and it is possible to reduce resource collisions with adjacent user equipments.

Apparatus Configuration

Next, an example of the functional configuration of the base station apparatus 10 and the user equipment 20 that perform the above-mentioned processes and operations will be described. The base station apparatus 10 and the user equipment 20 have a function of implementing the above-described embodiments. However, each of the base station apparatus 10 and the user equipment 20 may have only some of the functions described in the embodiments.

Base Station Apparatus 10

Figure 8:
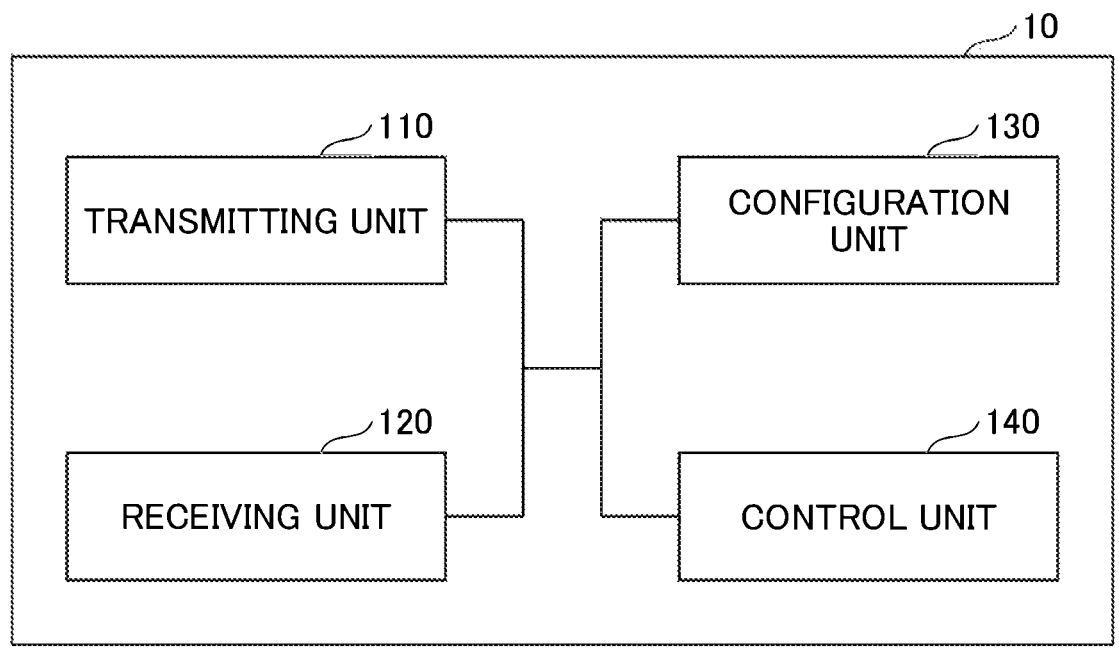
FIG. 8 is a diagram illustrating an example of the functional configuration of a base station apparatus 10 according to an embodiment.

FIG. 8 is a diagram illustrating an example of the functional configuration of the base station apparatus 10. As illustrated in FIG. 8, the base station apparatus 10 includes a transmitting unit 110, a receiving unit 120, a configuration unit 130, and a control unit 140. The functional configuration illustrated in FIG. 8 is only an example. The functional units may have any functions and any names as long as they can perform the operations according to the embodiments of the invention.

The transmitting unit 110 has a function that generates a signal to be transmitted to the user equipment 20 and wirelessly transmits the signal. In addition, the transmitting unit 110 transmits information related to control between the user equipments, such as SL scheduling, to the user equipment 20. The receiving unit 120 has a function that receives various signals transmitted from the user equipment 20 and acquires, for example, the information of an upper layer from the received signals.

The configuration unit 130 stores configuration information which has been configured in advance and various kinds of configuration information to be transmitted to the user equipment 20 in a storage device and reads the configuration information from the storage device if necessary. The content of the configuration information includes, for example, information related to the configuration of V2X.

The control unit 140 performs a process related to the configuration of the user equipment 20 for V2X as described in the embodiments. Further, a functional unit related to signal transmission in the control unit 140 may be included in the transmitting unit 110 and a functional unit related to signal reception in the control unit 140 may be included in the receiving unit 120.

User Equipment 20

Figure 9:
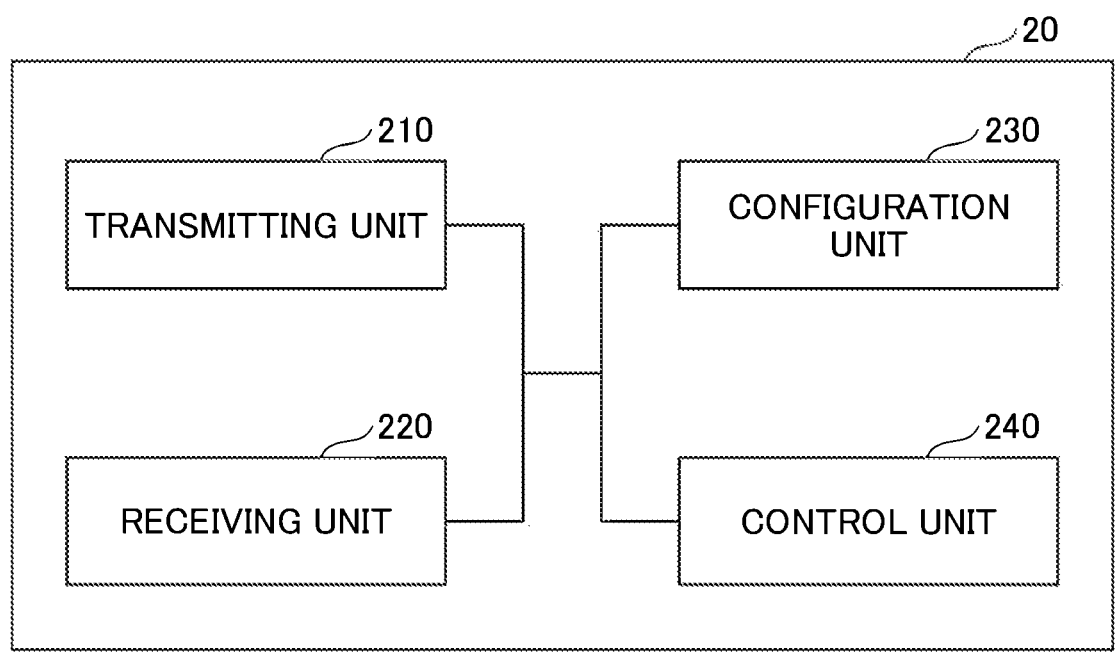
FIG. 9 is a diagram illustrating an example of the functional configuration of a user equipment 20 according to the embodiment.

FIG. 9 is a diagram illustrating an example of the functional configuration of the user equipment 20. As illustrated in FIG. 9, the user equipment 20 includes a transmitting unit 210, a receiving unit 220, a configuration unit 230, and a control unit 240. The functional configuration illustrated in FIG. 9 is only an example. The functional units may have any functions and any names as long as they can perform the operations according to the embodiments of the invention.

The transmitting unit 210 creates a transmission signal from transmission data and wirelessly transmits the transmission signal. The receiving unit 220 wirelessly receives various signals and acquires signals of an upper layer from the received signals of a physical layer. In addition, the receiving unit 220 has a function of receiving control information, such as SL scheduling, transmitted from the base station apparatus 10. The receiving unit 220 has a function of detecting resource reservation signaling transmitted from other user equipments. The transmitting unit 210 has a function of transmitting packets using the selected resources. In addition, the transmitting unit 210 has a function of transmitting resource reservation signaling.

The configuration unit 230 stores various kinds of configuration information received from the base station apparatus 10 or the user equipment 20 by the receiving unit 220 in the storage device and reads the information from the storage device if necessary. In addition, the configuration unit 230 stores configuration information which has been configured in advance. The content of the configuration information includes, for example, information related to V2X and HARQ processes.

The control unit 240 controls a resource selection procedure and resource reservation signaling as described in the embodiments. In addition, the control unit 240 performs V2X and HARQ processes. A functional unit related to signal transmission in the control unit 240 may be included in the transmitting unit 210 and a functional unit related to signal reception in the control unit 240 may be included in the receiving unit 220.

Hardware Configuration

The functional configuration diagrams (FIG. 8 and FIG. 9) used in the description of the above-mentioned embodiments of the invention illustrate the blocks of the functional units. The functional blocks (configuration units) are implemented by any combination of hardware and software. A means for implementing each functional block is not particularly limited. That is, each functional block may be implemented by one apparatus configured by physically and/or logically combining a plurality of elements or by connecting two or more apparatuses, which are physically and/or logically separated from each other, directly and/or indirectly (for example, wirelessly and/or in a wired manner) and using the plurality of apparatuses.

Figure 10:
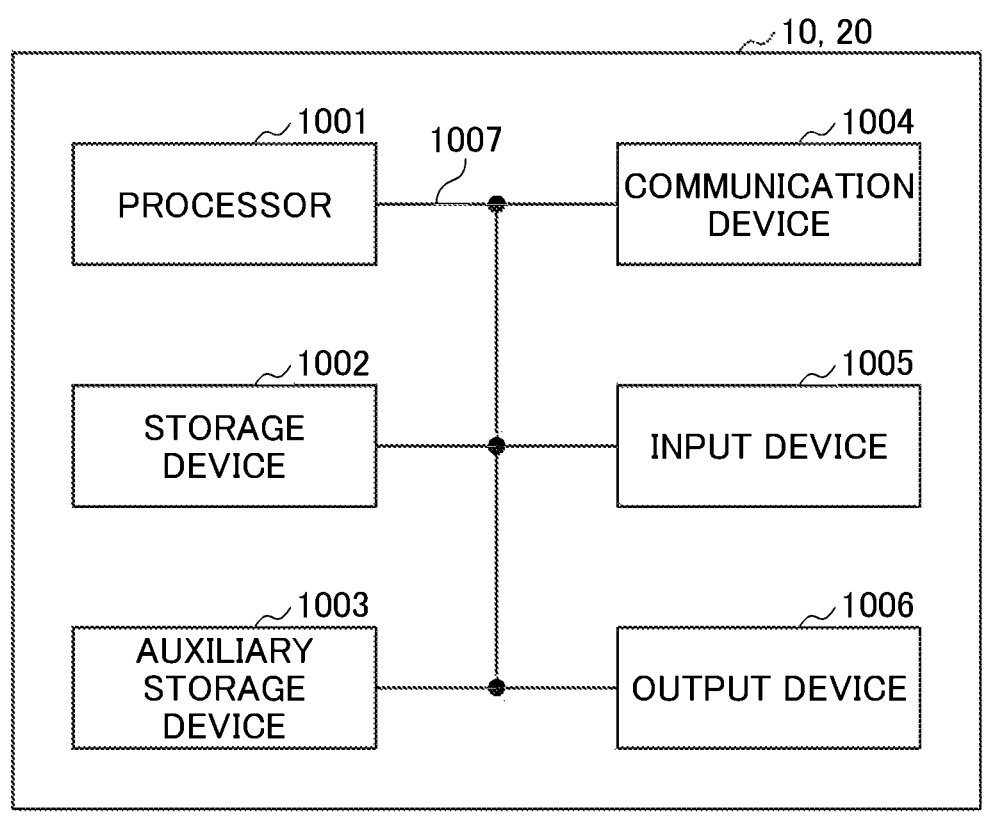
FIG. 10 is a diagram illustrating an example of the hardware configuration of the base station apparatus 10 and the user equipment 20 according to the embodiment.

For example, each of the base station apparatus 10 and the user equipment 20 according to an embodiment of the invention may function as a computer that performs the process according to the embodiment of the invention. FIG. 10 is a diagram illustrating an example of the hardware configuration of a wireless communication device which is the base station apparatus 10 or the user equipment 20 according to the embodiment of the invention. Each of the base station apparatus 10 and the user equipment 20 may be physically configured as a computer apparatus that includes, for example, a processor 1001, a storage device 1002, an auxiliary storage device 1003, a communication device 1004, an input device 1005, an output device 1006, and a bus 1007.

In the following description, the term "apparatus" can be replaced with, for example, a circuit, a device, or a unit. The hardware configuration of the base station apparatus 10 and the user equipment 20 may be configured to include one or more of the devices illustrated in FIG. 10 or may be configured not to include some of the devices.

Each of the functions of the base station apparatus 10 and the user equipment 20 is implemented by loading predetermined software (program) onto hardware, such as the processor 1001 and the storage device 1002, and causing the processor 1001 to perform an operation to control communication by the communication device 1004 and the reading and/or writing of data from and/or to the storage device 1002 and the auxiliary storage device 1003.

For example, the processor 1001 operates an operating system to control the entire computer. The processor 1001 may be a central processing unit (CPU) including, for example, an interface with peripheral devices, a control device, an arithmetic device, and a register.

The processor 1001 reads, for example, a program (program code), a software module, or data from the auxiliary storage device 1003 and/or the communication device 1004 to the storage device 1002 and performs various processes according to the read program, software module, or data. As the program, a program that causes the computer to perform at least some of the operations described in the above-mentioned embodiments is used. For example, the transmitting unit 110, the receiving unit 120, the configuration unit 130, and the control unit 140 of the base station apparatus 10 illustrated in FIG. 8 may be implemented by a control program that is stored in the storage device 1002 and is operated by the processor 1001. In addition, for example, the transmitting unit 210, the receiving unit 220, the configuration unit 230, and the control unit 240 of the user equipment 20 illustrated in FIG. 9 may be implemented by a control program that is stored in the storage device 1002 and is operated by the processor 1001. In the above description, the various processes are performed by one processor 1001. However, the various processes may be performed sequentially or at the same time by two or more processors 1001. The processor 1001 may be implemented by one or more chips. The program may be transmitted from the network through a telecommunication line.

The storage device 1002 is a computer-readable recording medium and may be configured by, for example, at least one of a read only memory (ROM), an erasable programmable ROM (EPROM), an electrically erasable programmable ROM (EEPROM), and a random access memory (RAM). The storage device 1002 may be referred to as, for example, a register, a cache, or a main memory (main storage device). The storage device 1002 can store, for example, an executable program (program code) or a software module for performing the process according to an embodiment of the invention.

The auxiliary storage device 1003 is a computer-readable recording medium and may be configured by, for example, at least one of an optical disc, such as a compact disc ROM (CD-ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a Floppy (registered trademark) disk, and a magnetic strip. The auxiliary storage device 1003 may also be referred to as an auxiliary storage device. The above-mentioned storage medium may be, for example, a database, a server, or other appropriate media including the storage device 1002 and/or the auxiliary storage device 1003.

The communication device 1004 is hardware (transmitting and receiving device) for communication between computers through a wired network and/or a wireless network and is referred to as, for example, a network device, a network controller, a network card, or a communication module. For example, the transmitting unit 110 and the receiving unit 120 of the base station apparatus 10 may be implemented by the communication device 1004. In addition, the transmitting unit 210 and the receiving unit 220 of the user equipment 20 may be implemented by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may be integrated (for example, a touch panel).

The devices, such as the processor 1001 and the storage device 1002, are connected to each other by the bus 1007 for information communication. The bus 1007 may be a single bus or different buses between the devices.

Each of the base station apparatus 10 and the user equipment 20 may include hardware, such as a microprocessor, a digital signal processor (DSP), an application specific integrated circuit (ASIC), a programmable logic device (PLD), and a field programmable gate array (FPGA) and some or all of the functional blocks may be implemented by the hardware. For example, the processor 1001 may be implemented by at least one of the hardware components.

Summary of Embodiments

As described above, according to the embodiments of the invention, there is provided a user equipment including: a transmitting unit that transmits a packet for terminal-to-terminal direct communication; and a control unit that selects a transmission resource for transmitting the packet from candidate resources in a resource selection window having a predetermined range.

A technique that defines a resource selection procedure for packet transmission and the transmission of resource reservation signaling in a wireless communication system supporting terminal-to-terminal direct communication is provided by the above-mentioned configuration.

Supplement of Embodiments

The embodiments of the invention have been described above. However, the disclosed invention is not limited to the embodiments. Those skilled in the art can understand various modifications, corrections, substitutions, replacements, and the like. The description has been made using specific numerical examples in order to facilitate the understanding of the invention. These numerical values are only examples and any appropriate values may be used unless otherwise stated. The classification of the items in the above description is not essential, but matters described in two or more items may be combined and used if necessary or matters described in a certain item may be applied to matters described in other items (unless the matters are inconsistent). The boundaries of the functional units or the processing units in the functional block diagrams may not necessarily correspond to the boundaries of physical components. The operations of the plurality of functional units may be performed physically by one component or the operation of one functional unit may be performed physically by a plurality of components. For the process procedures described in the embodiments, the order of the processes may be switched without being inconsistent. In order to facilitate the description of the processes, the base station apparatus 10 and the user equipment 20 have been described with reference to the functional block diagrams. However, the apparatuses may be implemented by hardware, software, or a combination thereof. Each of software operated by the processor included in the base station apparatus 10 according to the embodiments of the invention and software operated by the processor included in the user equipment 20 according to the embodiments of the invention may be stored in a random access memory (RAM), a flash memory, a read-only memory (ROM), an EPROM, an EEPROM, a register, a hard disk drive (HDD), a removable disk, a CD-ROM, a database, a server, or other appropriate storage media.

The indication of information is not limited to the aspects/embodiments described in the specification and may be performed by other methods. For example, the indication of information may be performed by physical layer signaling (for example, downlink control information (DCI) or uplink control information (UCI)), upper layer signaling (for example, radio resource control (RRC) signaling, medium access control (MAC) signaling, or broadcast information (a master information block (MIB) or a system information block (SIB)), other types of signaling, or a combination thereof. The RRC signaling may also be referred to as an RRC message. For example, the RRC signaling may be an RRC connection setup message or an RRC connection reconfiguration message.

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), and other appropriate systems and/or next-generation systems extended on the basis of these systems.

For example, the order of the process procedures, the sequence, and the flowchart in each aspect/embodiment described in the specification may be interchanged as long as there is no contradiction. For example, in the method described in the specification, elements of various steps are presented in an exemplary order and the invention is not limited to the presented specific order.

In the specification, a specific operation performed by the base station apparatus 10 may also be performed by an upper node according to circumstances. In a network including one network node or a plurality of network nodes having the base station apparatus 10, it is clear that various operations performed to communicate with the user equipment 20 can be performed by the base station apparatus 10 and/or a network node (for example, MME or S-GW is considered, but the network node is not limited thereto) other than the base station apparatus 10. The case in which the number of network nodes other than the base station apparatus 10 is 1 has been exemplified above. However, a plurality of other network nodes (for example, MME and S-GW) may be combined with each other.

The aspects/embodiments described in the specification may be independently used, may be combined and used, or may be switched and used in association with execution.

The user equipment 20 may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms, depending on the person skilled in the art.

The base station apparatus 10 may be referred to as NodeB (NB), evolved NodeB (eNB), gNB, a base station, or some other suitable terms, depending on the person skilled in the art.

The term "determining" used in the specification includes a wide variety of operations in some cases. The "determining" can include cases in which performing, for example, judging, calculating, computing, processing, deriving, investigating, looking up (for example, looking up in a table, a database, or other data structures), and ascertaining is considered to perform "determining". In addition, the "determining" can include cases in which performing, for example, receiving (for example, receiving information), transmitting (for example, transmitting information), inputting, outputting, and accessing (for example, accessing data in a memory) is considered to perform "determining". Further, the "determining" can include cases in which performing, for example, resolving, selecting, choosing, establishing, and comparing is considered to perform "determining". That is, the "determining" can include a case in which any operation is considered to perform "determining".

The term "based on" used in the specification does not mean "based on only" unless otherwise stated. In other words, the term "based on" means both "based on only" and "based on at least".

The terms "include", "including", and modifications thereof are intended to be inclusive as in the term "comprising" as long as they are used in the specification or the claims. Further, the term "or" used in the specification or the claims is not intended to be an exclusive OR.

In the entire present disclosure, for example, in a case in which the articles, such as a, an, and the, in English are added in translation, the articles may indicate plurality if they do not clearly indicate singular nouns in the context.

The invention has been described in detail above. However, it should be apparent to those skilled in the art that the invention is not limited to the embodiments described in the specification. The invention can be embodied as corrected and changed aspects without departing from the scope and spirit of the invention defined by the claims. Therefore, the description of the specification has been made for exemplary description and is not intended to have any restrictive meaning to the invention.

EXPLANATIONS OF LETTERS OR NUMERALS

10 BASE STATION APPARATUS
110 TRANSMITTING UNIT
120 RECEIVING UNIT
130 CONFIGURATION UNIT
140 CONTROL UNIT
20 USER EQUIPMENT
210 TRANSMITTING UNIT
220 RECEIVING UNIT
230 CONFIGURATION UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiving unit that receives an SCI format from another terminal of terminal-to-terminal direct communication;
a control unit that selects, as a candidate transmission resource, a resource other than a resource that is determined by the SCI format received from the another terminal, from a resource selection range, the candidate transmission resource being used for data transmission by the terminal-to-terminal direct communication; and
a transmitting unit that transmits an SCI format via a first resource of the selected transmission resource,
wherein the resource selection range is a range from a slot obtained by adding a first value to a reference slot via which a parameter is received from an upper layer, to a slot obtained by adding a second value to the reference slot, and
wherein in response to transmission of the resource being stopped, reselecting a resource replacing the stopped resource.

2. A communication system comprising: a terminal; and a base station, wherein
the terminal includes:
a receiving unit that receives an SCI format from another terminal of terminal-to-terminal direct communication;
a control unit that selects, as a candidate transmission resource, a resource other than a resource that is determined by the SCI format received from the another terminal, from a resource selection range, the candidate transmission resource being used for data transmission by the terminal-to-terminal direct communication; and
a transmitting unit that transmits an SCI format via a first resource of the selected transmission resource,
wherein the resource selection range is a range from a slot obtained by adding a first value to a reference slot via which a parameter is received from an upper layer, to a slot obtained by adding a second value to the reference slot, and
wherein in response to transmission of the resource being stopped, reselecting a resource replacing the stopped resource, and
the base station includes
a transmitting unit that transmits the parameter via the upper layer.

3. A communication method of a terminal, comprising:
receiving an SCI format from another terminal of terminal-to-terminal direct communication;
selecting, as a candidate transmission resource, a resource other than a resource that is determined by the SCI format received from the another terminal, from a resource selection range, the candidate transmission resource being used for data transmission by the terminal-to-terminal direct communication; and
transmitting an SCI format via a first resource of the selected transmission resource,
wherein the resource selection range is a range from a slot obtained by adding a first value to a reference slot via which a parameter is received from an upper layer, to a slot obtained by adding a second value to the reference slot, and
wherein in response to transmission of the resource being stopped, reselecting a resource replacing the stopped resource.

* * * * *